(No Model.)
H. KENDALL.
CORN PLANTER.
No. 355,613. Patented Jan. 4, 1887.
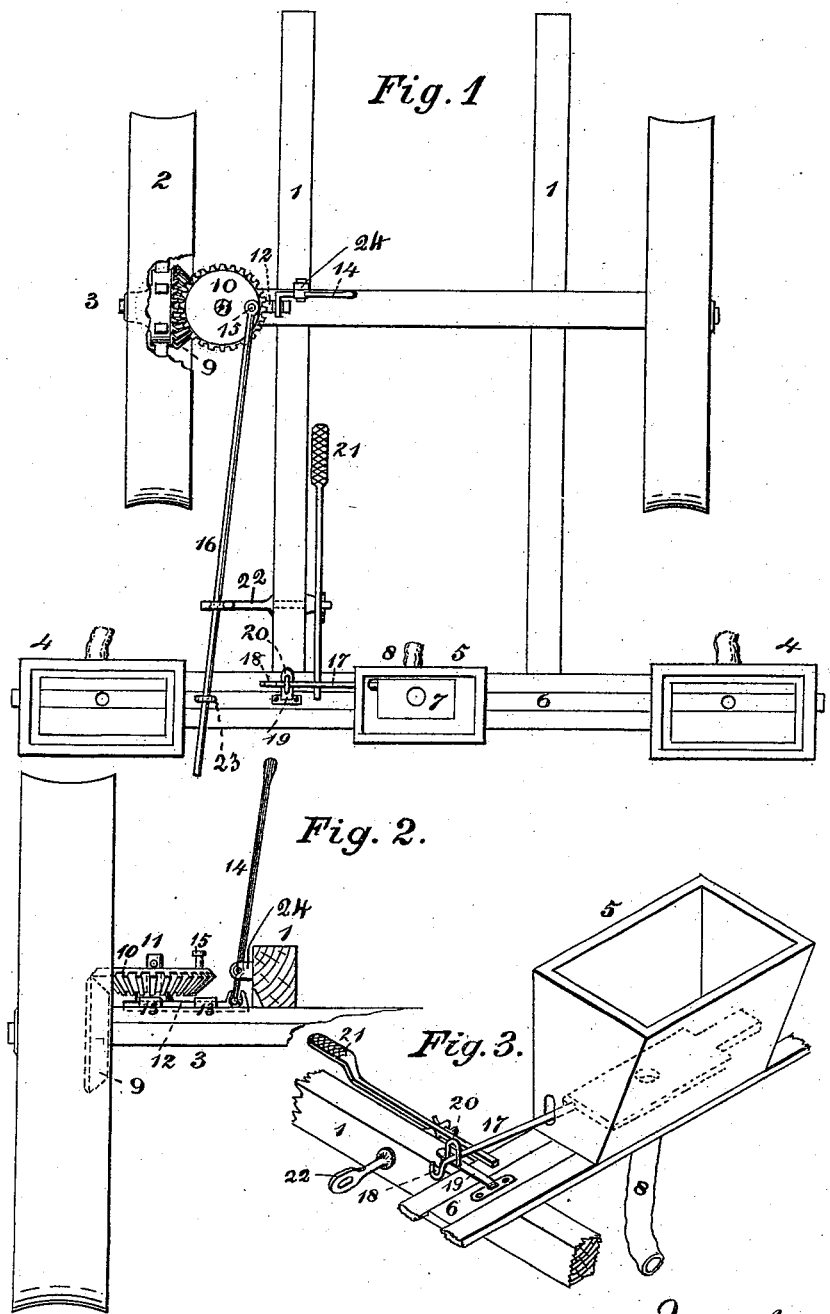
Attest:
H. B. Knight
Edward Stein
Inventor:
Henry Kendall
By Knight Bros.
Attys.

UNITED STATES PATENT OFFICE.

HENRY KENDALL, OF XENIA, OHIO.

CORN-PLANTER.

SPECIFICATION forming part of Letters Patent No. 355,613, dated January 4, 1887.

Application filed September 10, 1886. Serial No. 213,215. (No model.)

*To all whom it may concern:*

Be it known that I, HENRY KENDALL, of Xenia, Greene county, Ohio, have invented a new and useful Improvement in Corn-Planters, of which the following is a specification.

In the accompanying drawings, Figure 1 is a top view of a corn-planter and ground-marker embodying my invention. Fig. 2 is a front view of the reversible-geared connection of the slide-operating mechanism with the ground-wheel. Fig. 3 is a perspective view of the working mechanism.

1 may represent portions of the frame of a corn-planter.

2 represents one of the ground-wheels mounted on a shaft or axle, 3, which is journaled in said frame.

Supported upon and secured to the frame 1 are two grain boxes or hoppers, 4, and (intermediately between said hoppers) a receptacle, 5, for lime or other powder for marking purposes. A grain-delivering slide, 6, of customary construction, extends underneath and operates to liberate modicums of grain from both hoppers.

The receptacle 5 has a slide, 7, which, when connected with the grain-delivering slide 6, moves synchronously with the latter, and operates to deliver marking-powder into a flexible spout, 8, whose ventage is, before starting the implement to work, fixed at a point which will deliver the masses of powder at any desired locality upon the ground with relation to the deposits of grain.

Concentrically attached to the ground-wheel's inner side is a bevel gear-wheel, 9, which meshes with a somewhat larger bevel gear-wheel, 10. The bevel gear-wheel 10 revolves in a horizontal plane about a stud, 11, that extends vertically from a slide, 12, which is confined in ways 13 upon the frame 1 over the axle. A lever, 14, which extends from slide 12 to a bracket, 24, in a convenient place upon the machine, where it is hinged, enables the operator to place the wheel 10 either in or out of gear with the wheel 9. 22 is an eyebolt or bracket. A wrist, 15, upon the wheel 10 connects by lever 16, passing through the eye of the bolt 22 as a fulcrum, with a staple, 23, on the grain-slide 6. The marker-slide has a spring tongue or projection, 17, which has a nick or indentation, 18.

Projecting from the grain-slide is a bracket, 19, that terminates in a loop, 20, which embraces the tongue 17. In the normal condition of the parts the operation of the grain-slide is not accompanied by any operation of the marker-slide, and in such condition, consequently, no marking-powder is deposited.

To enable operation of the marker to take place automatically and synchronously with that of the grain-slide at the option of the operator, I provide a treadle, 21, pivoted to the inner end of the bolt 22, whose end nearest the operator being depressed by placing his foot upon it, the remote end of said treadle presses upward against the tongue 17, and thereby brings its nick 18 in engagement with the loop 20. A consequence of this engagement is that for the time being the marker-slide participates in each and every stroke of the grain-slide, with a consequent simultaneous deposit of grain and marking-powder at their assigned places.

Whenever it is desired to shift or remove the implement without depositing either grain or marking-powder, it is merely necessary for the operator, by means of the lever 14, to temporarily throw wheel 10 out of gear with wheel 9, which having been done, the implement may be drawn like an ordinary cart from place to place without affecting the dropping mechanism or wasting grain or marking-powder.

I claim as new and of my invention—

1. The combination, with the seed-slide, of the bracket 19, extending rearwardly therefrom, formed with a vertical loop, 20, marker-hopper 5 over the seed-slide, having a slide, 7, provided with a spring-tongue, 17, extending from the hopper, formed with indentation 18, the bolt 22, and the treadle 21, pivoted to the bolt and engaging the spring-tongue over the seed-slide, substantially as described.

2. The combination of an axle, 3, a seed-slide, 6, having a staple, 23, the eyebolt 22, ground-wheel 2, vertical bevel gear-wheel secured around the axle to the ground-wheel, the ways 13 over the axle, a slide, 12, guided in said ways, having a vertical stud, 11, horizontal bevel gear-wheel journaled on the stud, having wrist-pin 15, the rod 16, extending from the wrist-pin through the eye of the bolt and through the staple, bracket 24, and a lever, 14, hinged to the bracket for operating the slide 12 over the axle, substantially as described.

In testimony of which invention I hereunto set my hand.

HENRY KENDALL.

Attest:
  JEREMIAH PARKHILL,
  JAMES KYLE.